United States Patent
Schneider et al.

(10) Patent No.: US 9,401,628 B2
(45) Date of Patent: Jul. 26, 2016

(54) PERMANENTLY EXCITED SYNCHRONOUS MACHINE WITH FERRITE MAGNETS

(71) Applicant: Siemens Aktiengesellschaft, München (DE)

(72) Inventors: Wolfgang Schneider, Fulda (DE); Rolf Vollmer, Gersfeld (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 289 days.

(21) Appl. No.: 14/025,074

(22) Filed: Sep. 12, 2013

(65) Prior Publication Data

US 2014/0070655 A1   Mar. 13, 2014

(30) Foreign Application Priority Data

Sep. 13, 2012 (EP) .................................... 12184270

(51) Int. Cl.
| | |
|---|---|
| H02K 21/12 | (2006.01) |
| H02K 1/27 | (2006.01) |
| H02K 21/14 | (2006.01) |

(52) U.S. Cl.
CPC .............. *H02K 1/272* (2013.01); *H02K 1/2766* (2013.01); *H02K 21/14* (2013.01); *H02K 2201/03* (2013.01)

(58) Field of Classification Search
CPC ........ H02K 1/272; H02K 1/2766; H02K 1/27
USPC ....................... 310/156.01–156.84
See application file for complete search history.

(56) References Cited

U.S. PATENT DOCUMENTS

| | | | |
|---|---|---|---|
| 4,663,551 A | 5/1987 | Weh et al. | |
| 6,483,221 B1 | 11/2002 | Pawellek et al. | |
| 6,628,031 B2 | 9/2003 | Vollmer | |
| 6,768,238 B2 | 7/2004 | Knauff et al. | |
| 6,812,612 B2 | 11/2004 | Schunk et al. | |
| 6,858,965 B2 | 2/2005 | Mueller et al. | |
| 6,885,187 B2 | 4/2005 | Duenisch et al. | |
| 6,943,467 B2 | 9/2005 | Potoradi et al. | |
| 7,141,905 B2 | 11/2006 | Vollmer | |
| 7,285,883 B2 | 10/2007 | Bott et al. | |
| 7,313,861 B2 | 1/2008 | Schneider et al. | |
| 7,564,158 B2 | 7/2009 | Huth et al. | |
| 7,638,913 B2 * | 12/2009 | Ionel ................... | H02K 1/2726 310/112 |

(Continued)

FOREIGN PATENT DOCUMENTS

| | | |
|---|---|---|
| DE | 10 2007 051 105 A1 | 4/2009 |
| EP | 0 126 997 A1 | 12/1984 |
| EP | 1 850 454 A1 | 10/2007 |

*Primary Examiner* — Hanh Nguyen
(74) *Attorney, Agent, or Firm* — Henry M. Feiereisen LLC.

(57) ABSTRACT

A permanently excited synchronous machine includes a stator; a winding system arranged in grooves of a laminated core of the stator and forming winding overhangs on end faces of the laminated core, and a rotor connected in fixed rotative engagement to the shaft and having ferrite magnets which extend axially beyond the end faces of the laminated core. The rotor electromagnetically interacts with the stator across an air gap there between during operation of the permanently excited synchronous machine to cause a rotation about an axis of rotation. A flux concentration element is provided radially across each of the ferrite magnets of a magnetic pole and bundles magnetic field lines of the ferrite magnet onto an axial length of the laminated core of the stator. The flux concentration elements and held by a fixing element on the ferrite magnets of a magnetic pole.

10 Claims, 3 Drawing Sheets

(56) References Cited

U.S. PATENT DOCUMENTS

| | | |
|---|---|---|
| 7,663,282 B2 | 2/2010 | Ogava |
| 7,705,507 B2 | 4/2010 | Vollmer |
| 7,709,984 B2 | 5/2010 | Braun et al. |
| 7,732,967 B2 | 6/2010 | Schunk et al. |
| 7,755,315 B2 | 7/2010 | Bott et al. |
| 7,777,373 B2 | 8/2010 | Bott et al. |
| 7,859,160 B2 | 12/2010 | Vollmer |
| 7,915,777 B2 | 3/2011 | Vollmer |
| 7,977,826 B2 | 7/2011 | Vollmer et al. |
| 8,026,640 B2 | 9/2011 | Bott et al. |
| 8,035,371 B2 | 10/2011 | Budde et al. |
| 8,063,517 B2 | 11/2011 | Bott et al. |
| 8,115,360 B2 | 2/2012 | Vollmer |
| 8,134,273 B2 | 3/2012 | Vollmer et al. |
| 8,227,951 B2 | 7/2012 | Grossmann et al. |
| 8,283,815 B2 | 10/2012 | Vollmer |
| 8,354,767 B2 * | 1/2013 | Pennander .......... H02K 1/2793 310/156.02 |
| 8,378,541 B2 | 2/2013 | Vollmer |
| 2006/0219880 A1 | 10/2006 | Braun et al. |
| 2007/0040466 A1 | 2/2007 | Vollmer |
| 2007/0114861 A1 | 5/2007 | Bott et al. |
| 2007/0257566 A1 | 11/2007 | Vollmer |
| 2007/0257575 A1 | 11/2007 | Vollmer |
| 2008/0169718 A1 | 7/2008 | Bott et al. |
| 2008/0185931 A1 | 8/2008 | Platen et al. |
| 2008/0289440 A1 | 11/2008 | Denk et al. |
| 2008/0315704 A1 | 12/2008 | Vollmer |
| 2009/0009114 A1 | 1/2009 | Schunk et al. |
| 2009/0015080 A1 | 1/2009 | Vollmer et al. |
| 2009/0152959 A1 | 6/2009 | Vollmer |
| 2009/0152976 A1 | 6/2009 | Bott et al. |
| 2009/0160283 A1 | 6/2009 | Bott et al. |
| 2009/0184602 A1 | 7/2009 | Braun et al. |
| 2009/0251013 A1 | 10/2009 | Vollmer et al. |
| 2009/0315424 A1 | 12/2009 | Vollmer |
| 2010/0000830 A1 | 1/2010 | Budde et al. |
| 2010/0013333 A1 | 1/2010 | Vollmer |
| 2010/0133940 A1 | 6/2010 | Grossmann et al. |
| 2010/0264770 A1 | 10/2010 | Braun et al. |
| 2011/0006617 A1 | 1/2011 | Budde et al. |
| 2012/0025654 A1 | 2/2012 | Bach et al. |
| 2012/0038228 A1 | 2/2012 | Vollmer |

* cited by examiner

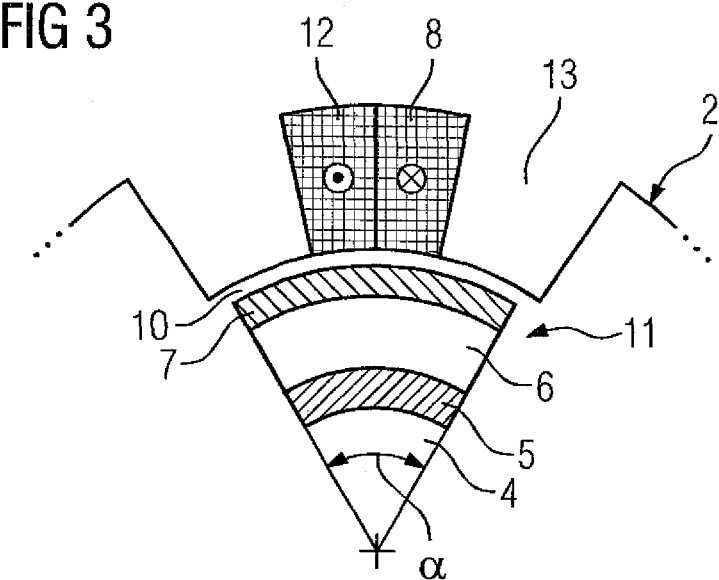
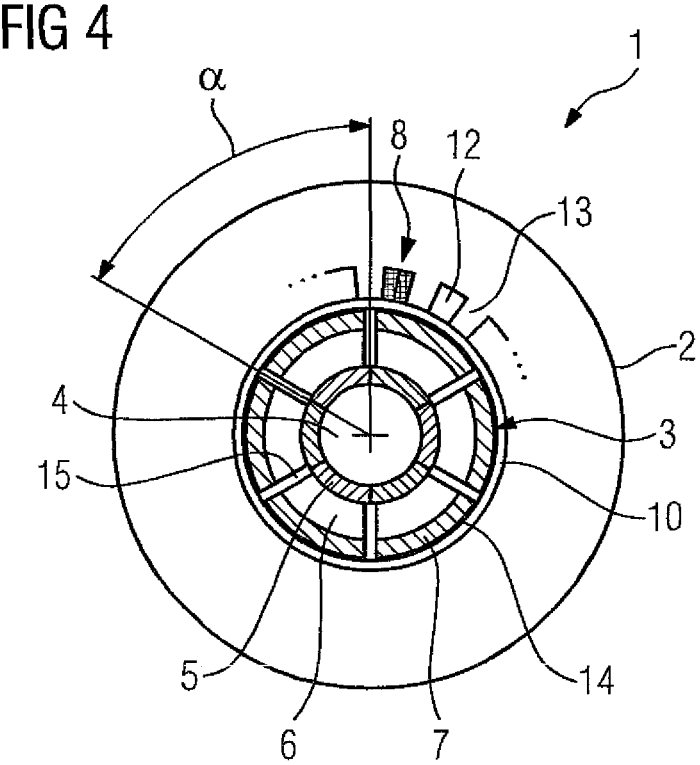

PERMANENTLY EXCITED SYNCHRONOUS MACHINE WITH FERRITE MAGNETS

CROSS-REFERENCES TO RELATED APPLICATIONS

This application claims the priority of European Patent Application, Serial No. EP 12184270.2, filed Sep. 13, 2013, pursuant to 35 U.S.C. 119(a)-(d), the disclosure of which is incorporated herein by reference in its entirety as if fully set forth herein.

BACKGROUND OF THE INVENTION

The present invention relates to a permanently excited synchronous machine.

The following discussion of related art is provided to assist the reader in understanding the advantages of the invention, and is not to be construed as an admission that this related art is prior art to this invention.

Rare earth magnets can be used to obtain a high air gap induction with permanently excited synchronous machines. However, rare earth magnets are very expensive, so attempts are made to switch to more inexpensive ferrite magnets. This has proven difficult and required a rotor with a comparatively high number of poles to obtain a high air gap induction.

It would therefore be desirable and advantageous to provide an improved permanently excited synchronous machine which obviates prior art shortcomings and which is configured to obtain a sufficiently high air gap induction when using inexpensive ferrite magnets in the air gap of the permanently excited synchronous machine, while the rotor has a comparatively low number of poles.

SUMMARY OF THE INVENTION

According to one aspect of the present invention, a permanently excited synchronous machine includes a shaft, a stator having a laminated core, a winding system arranged in grooves of the laminated core and forming winding overhangs on end faces of the laminated core, a rotor connected in fixed rotative engagement to the shaft and having ferrite magnets which extend axially beyond the end faces of the laminated core, the rotor electromagnetically interacting with the stator across an air gap between the stator and the rotor during operation of the permanently excited synchronous machine to cause a rotation about an axis of rotation, a flux concentration element provided radially across each of the ferrite magnets of a magnetic pole and bundling magnetic field lines of the ferrite magnet onto an axial length of the laminated core of the stator, and a fixing element holding and positioning the flux concentration elements on the ferrite magnets of a magnetic pole.

According to another aspect of the present invention, a method for producing a rotor includes fixing ferrite magnets to a shaft, arranging flux concentration elements on the ferrite magnets, and fixing magnetic poles formed by the flux concentration elements and the ferrite magnets to the shaft by fixing elements.

According to still another aspect of the present invention, a method for producing a rotor includes producing individual magnetic poles by at least one ferrite magnet and a flux concentration element radially adjoining the ferrite magnet, arranging the magnetic poles on a shaft, and fixing the magnetic poles to the shaft by fixing elements.

The present invention resolves prior art shortcomings by directly gluing or fixing in some other way the ferrite magnets to a soft magnet, in particular the shaft, with a magnetic pole being configured longer axially than the laminated core of the stator. A magnetic pole can hereby be formed in the axial direction and/or direction of rotation by way of one or more ferrite magnets.

Basically a rotor of this kind can be produced in two ways.

It is either constructed in layers radially starting from the shaft, i.e. firstly the ferrite magnets are fixed, in particular glued, to the shaft. The flux concentration elements are then attached radially over the respective ferrite magnets. The entire package can then be fixed and positioned using fixing elements.

In the second possibility, each pole is produced individually in advance and then these poles are fixed to the shaft. The entire package can then be fixed and positioned using fixing elements.

Pole gaps, which result in each of the methods of production described above and which are also technically necessary, are either implemented using suitable materials preferably before fixing or bandaging. These materials are amagnetic and electrically non-conductive.

The flux of the ferrite magnet can be concentrated or bundled onto the active length, i.e. the laminated core of the stator, and transferred to the stator via the air gap by way of the flux concentration elements arranged radially over the ferrite magnets. This achieves a sufficiently high air gap induction which has an extremely positive effect in particular with a length ratio of a magnetic pole to the axial length of the laminated core of the stator of >1.8. A fixing element is provided radially over the flux concentration elements to absorb the centrifugal forces of the arrangement of the rotor. These fixing elements are either an amagnetic bush which is applied axially over the arrangement of shaft, ferrite magnet and flux concentration element or a fiberglass bandage. When the fixing element is designed as a fiberglass bandage, additional devices are to be provided which define definite starting and end points for the bandage. These defined starting and end points are advantageously located axially outside of the air gap of the permanently excited synchronous machine, i.e. beyond the end faces of the laminated core of the stator.

To prevent eddy current losses in the region of the laminated core of the stator, which are produced owing to tooth harmonic waves or other harmonic waves, this region can be designed so as to be laminated.

According to another advantageous feature of the present invention, the flux concentration element can have a contour, viewed in a direction of rotation, which is configured in a region of the air gap to generate a sinusoidal air gap field in which the air gap has a radial extension which is smaller in a middle of the magnetic pole than at an edge of the magnetic pole. This advantage is established irrespective of whether the flux concentration element in the region of the laminated core of the stator is designed in one piece or so as to be laminated.

The axial flux concentration together with a scatter-resistant construction achieves a high air gap induction. Only the rotor becomes longer thereby; the stator, however, can be dimensioned as it is when high energy magnets are used. In its axial additional length the flux concentration element is advantageously arranged below the winding overhangs of the stator, so the machine as a whole is not significantly longer axially.

The design of the outer contour of the flux concentration elements also reduces the torque ripple and the amplitudes of the magnetic field waves in the iron of the stator are reduced, and this leads to comparatively low heating of the stator reduced by hysteresis and eddy current losses.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a cutaway view, on an enlarged scale, of a magnetic pole of the permanently excited synchronous machine;

FIG. 4 is a cross-section of a variation of a permanently excited synchronous machine according to the present invention.

DETAILED DESCRIPTION OF PREFERRED EMBODIMENTS

Figure 1:
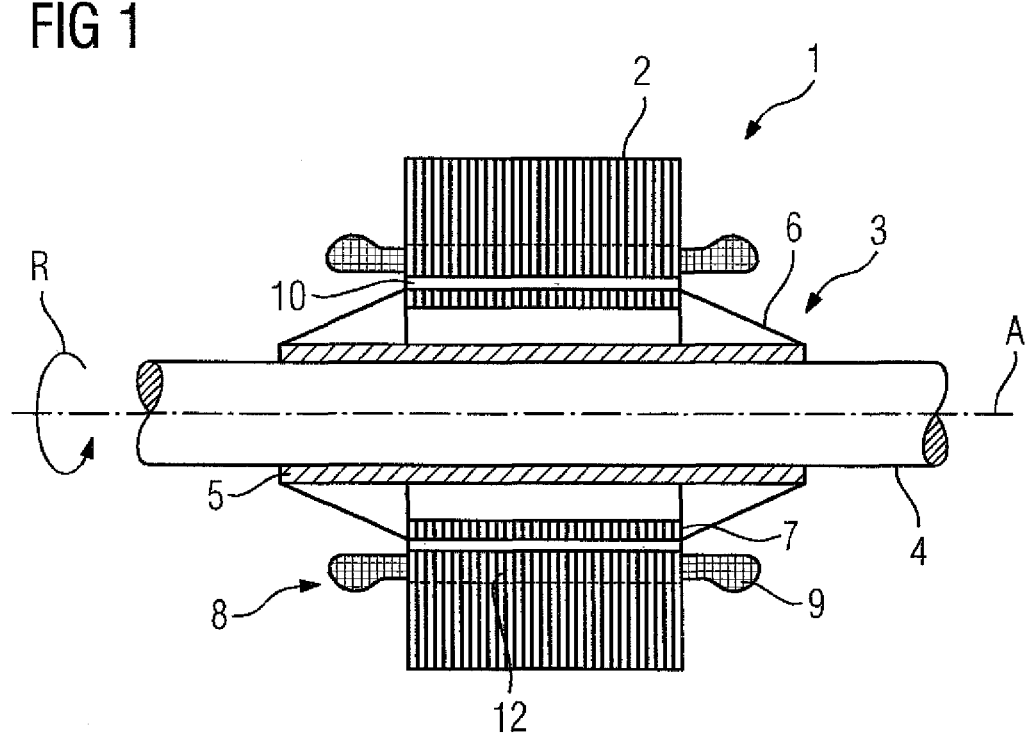
FIG. 1 is a longitudinal section of a basic configuration of a permanently excited synchronous machine according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a longitudinal section of a basic configuration of permanently excited synchronous machine according to the present invention, generally designated by reference numeral 1. The permanently excited synchronous machine 1 includes a stator 2 and a winding system 8 which is embedded in grooves 12 of a laminated core of the stator 2 and forms winding overhangs 9 at the end faces of the laminated core of the stator 2. Radially inwardly spaced apart from an air gap 10 is a rotor 3 which is non-rotatably connected to a shaft 4 and during operation of the permanently excited synchronous machine 1 moves about an axis of rotation A in the direction of rotation R. Arranged directly on the soft magnetic shaft 4 in a dish-like manner are preferably radially magnetized ferrite magnets 5. These ferrite magnets 5 may be glued to the shaft 4.

Cube-shaped ferrite magnets 5 may also be used and may be positioned on a specific polygonally arranged bush, which in turn is non-rotatably connected to the shaft 4. The shaft 4 can have flat faces, however, which are created by a material-removing procedure.

A flux concentration element 6, which is of one-piece construction and guides or concentrates or bundles the magnetic flux in the direction of the air gap 10, radially outwardly adjoins each magnetic pole 11 which is formed by one or more ferrite magnets 5.

Figure 5:
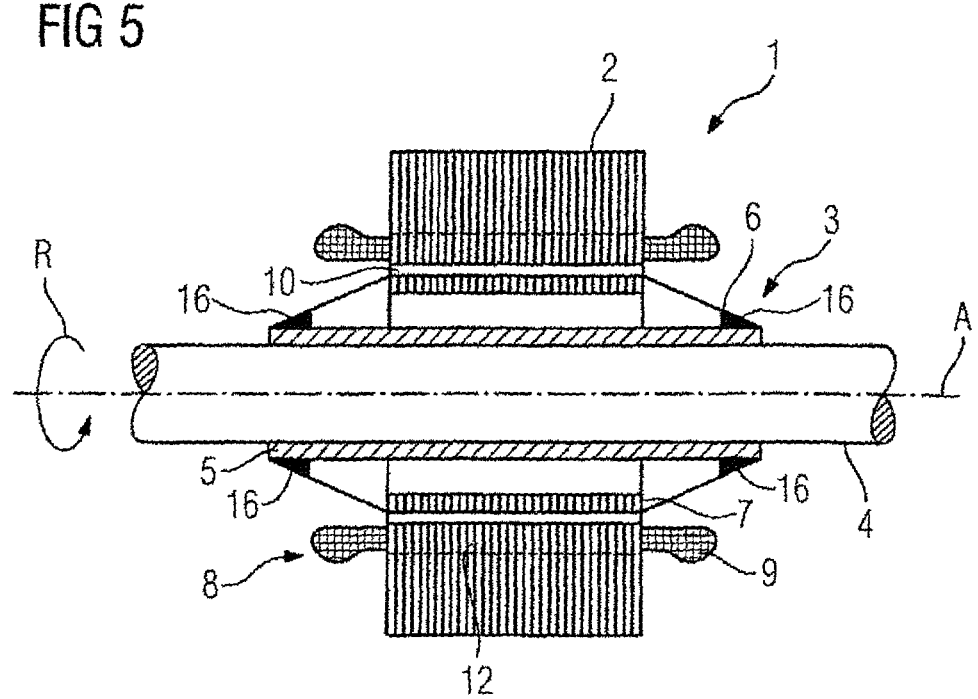
FIG. 5 is a longitudinal section of the permanently excited synchronous machine of FIG. 1 with depiction of a cap or sleeve to fix a bandage.

To additionally fix the individual flux concentration elements 6 of the respective magnetic poles 11 to the ferrite magnets 5, a bandage 14 is provided on the radially outer circumference of the rotor 3, the starting and end points of which bandage are preferably arranged on the cone-like flanks radially below the winding head 9. Devices like a cap or sleeve 16, as shown in FIG. 5, may be glued for example in sections of the flux concentration element to allow the bandage to be fixed at its start as well as at its end.

Figure 2:
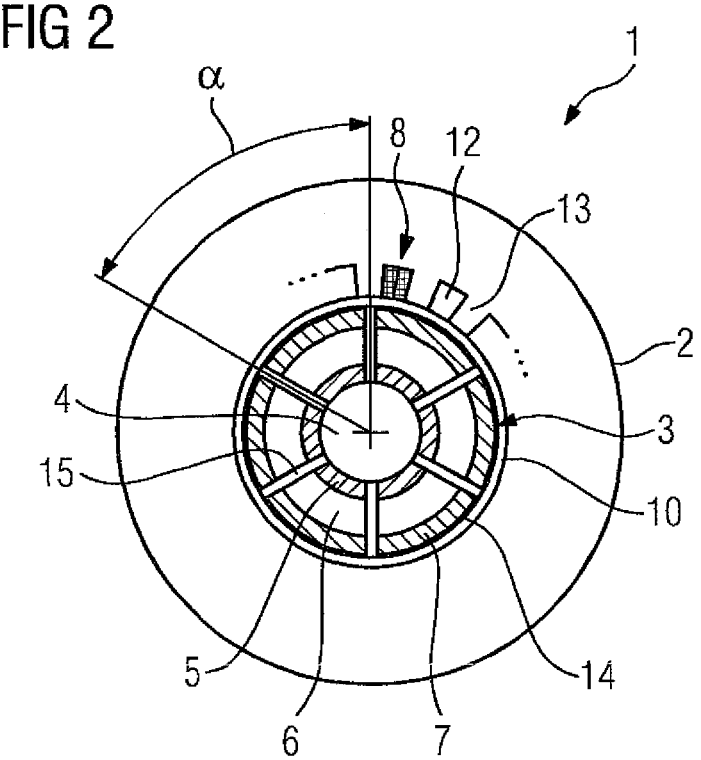
FIG. 2 is a cross-section of the permanently excited synchronous machine.

FIG. 2 shows a cross-section of a magnetic pole 11 with a pole pitch ratio, with the magnetic pole 11 having a pole covering of almost 100%. The pole gaps 15 are accordingly narrow in design. The pole gaps 15 prevent the magnetic flux between adjacent magnetic poles 11 from "short-circuiting", without having "flowed" over the air gap 10 of the electric machine 1 or over the soft magnetic shaft 4.

The pole gaps 15 are either free gaps, i.e. filled only with air or with an amagnetic, electrically non-conductive material.

The pole gaps 15, i.e. the gaps between two adjacent magnetic poles 11, extend radially either to the shaft 4 or only to ferrite magnets 5. In the first case, the ferrite magnets 5 exactly form with their flux concentration elements 6 according to FIGS. 2 and 3 the pole pitch angle α. The pole gap 15 is therefore also between the ferrite magnets 5 of adjacent magnetic poles 11. In the second case, the ferrite magnets 5 of the adjacent magnetic poles 11 lie directly against each other according to FIG. 4. Viewed radially, the pole gap 15 then ends at the surface of the ferrite magnets 5. Owing to the material properties of the magnets there is therefore no magnetic short circuit.

The flux concentration element 6 is advantageously provided in the region of the air gap 10 with a surface contour in the direction of rotation in such a way that the air gap 10 is smaller in the center of the pole than at its pole ends. A sinusoidal air gap field is created thereby.

To reduce the eddy current losses, in particular in the region close to the surface of the flux concentration element 6 in the region of the air gap 10, this region—as may also be seen in FIG. 1—is designed so as to be laminated. This lamination 7 is let into the flux concentration element 6 by a few mm, preferably 0.5 to 5 mm.

FIG. 3 shows in a detailed illustration a magnetic pole 11 with its pole division ratio α and the winding system 8 of a stator 2 whose winding system is constructed from toothed coils in such a way that each coil has one tooth 13.

The permanently excited synchronous machine 1 according to the present invention realizes a sufficiently high air gap induction in the air gap 10 with inexpensive use of ferrite magnets 5. The magnetic poles 11 have an outer contour which produces a sinusoidal air gap field. The torque ripple is therefore reduced on the one hand and the amplitudes of the magnetic field waves in the iron of the stator 2 are reduced on the other hand. This construction is also comparatively scatter-resistant. These features lead to lower warming of the stator 2 due to reduced hysteresis and eddy current losses.

To obtain a permanently excited synchronous machine 1, an inventive rotor 3 is firstly non-rotatably connected to the shaft 4 and then inserted in the hole in the stator 2. The shaft 4 is rotatably held by bearings (not shown), wherein bearing shields receive the bearings and are secured to the stator—in the case of machines without a housing—or to the housing.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A permanently excited synchronous machine, comprising:
    a shaft;
    a stator having a laminated core;
    a winding system arranged in grooves of the laminated core and forming winding overhangs on end faces of the laminated core;
    a rotor connected in fixed rotative engagement to the shaft and having ferrite magnets which extend axially beyond the end faces of the laminated core, said rotor electromagnetically interacting with the stator across an air gap between the stator and the rotor during operation of the permanently excited synchronous machine to cause a rotation about an axis of rotation;
    a flux concentration element provided radially across each of the ferrite magnets of a magnetic pole and bundling magnetic field lines of the ferrite magnet onto an axial length of the laminated core of the stator; and
    a fixing element holding and positioning the flux concentration elements on the ferrite magnets of a magnetic pole.

2. The permanently excited synchronous machine of claim 1, wherein the flux concentration element has a contour, viewed in a direction of rotation, is configured in a region of the air gap to generate a sinusoidal air gap field in which the air gap has a radial extension which is smaller in a middle of the magnetic pole than at an edge of the magnetic pole.

3. The permanently excited synchronous machine of claim 1, wherein the flux concentration element is laminated in a region of the air gap.

4. The permanently excited synchronous machine of claim 1, wherein the fixing element is configured as an amagnetic sheet-metal bush.

5. The permanently excited synchronous machine of claim 1, wherein the fixing element is configured as a fiberglass bandage, and further comprising devices provided in sections of the flux concentration element to allow the bandage to be fixed at its start as well as at its end.

6. The permanently excited synchronous machine of claim 5, wherein the sections have a conical configuration.

7. The permanently excited synchronous machine of claim 1, wherein the magnetic pole is formed by one or more ferrite magnets and has an axial length, which corresponds to about 1.8 times an axial length of the laminated core of the stator.

8. The permanently excited synchronous machine of claim 1, wherein the ferrite magnets are shaped in the form of a dish defined by an internal radius which corresponds to an external radius of the shaft.

9. The permanently excited synchronous machine of claim 1, wherein the ferrite magnets have a substantially radial magnetization.

10. The permanently excited synchronous machine of claim 1, wherein the ferrite magnets are fixed to the shaft.

* * * * *